A. CYR.
PULLEY.
APPLICATION FILED MAY 12, 1919.

1,400,142.

Patented Dec. 13, 1921.

Inventor
Alexandre Cyr

By
*[signature]*
Attorney

UNITED STATES PATENT OFFICE.

ALEXANDRE CYR, OF IBERVILLE, QUEBEC, CANADA.

PULLEY.

1,400,142.　　　　Specification of Letters Patent.　　Patented Dec. 13, 1921.

Application filed May 12, 1919. Serial No. 296,577.

*To all whom it may concern:*

Be it known that ALEXANDRE CYR, a British subject, residing at Iberville, county of Iberville, Province of Quebec, Dominion of Canada, has invented certain new and useful Improvements in a Pulley; and he does hereby declare that the following is a full, clear, and exact description of the same.

The present invention relates to improvements in clothes line pulleys and the object of the invention is to provide a device of this character whereby a pole to raise the clothes line from the ground will be eliminated as the pulley is provided with a device to take up slack from the rope.

To better understand the invention reference should be had from the accompanying drawings in which.

Like numerals of reference indicate corresponding parts in each figure.

Figure 1:
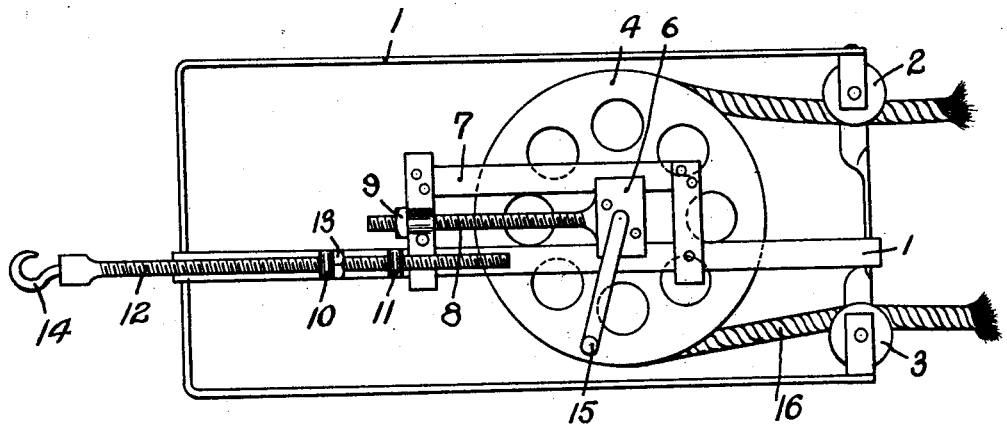
Figure 1 represents a side elevation of the improved pulley.
Figure 2:
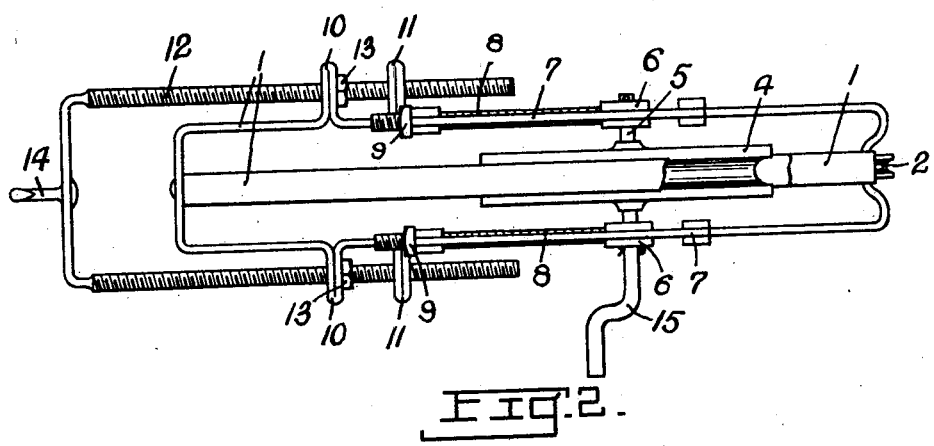
Fig. 2 is a top view illustrating the means for adjusting the pulley and the pulley rack.

In the drawings: 1 represents the frame of the device which is provided with two rigidly secured pulleys 2 and 3 at its upper and lower front ends. 4 is the main pulley or clothes line pulley rigidly secured on the shaft 5, said shaft 5 being loosely and rotatably secured in the blocks 6, said blocks being slidably mounted on the inner frames 7 which are suitably connected to opposite sides of the frame 1. 8 are threaded rods rigidly secured to said blocks 6 and each provided with a threaded nut 9 which serves to adjust the corresponding block 6 in the inner frame 7.

The frame 1 is provided on each side thereof with two outwardly-extending lugs 10 and 11 which are integral therewith.

The lugs 10 and 11 are centrally perforated to serve as guides for the U-shaped bracket 12 which is threaded at both ends and passes through the perforated lugs 10 and 11. 13 are nuts mounted on said threaded ends of brackets 12 between the lugs 10 and 11, and 14 is a hook provided at the outer end of said bracket 12 which is adapted to secure the frame 1 to a wall or other suitable place.

On the shaft 5 of the pulley 4 is provided a handle 15, and 16 is a clothes line mounted over the said pulley 4.

The pulley 4 is operated by the handle 15 or in the usual way, that is, by pulling on the line 16. The clothes are hung on the line and naturally, on account of the weight, will pull the line down.

The usual method is to lift the line with a pole. With this improved pulley, the slack of the line is taken up by screwing the nuts 9 on the rods 8, thus pulling the pulley back and tightening the line. If this is not sufficient, the nuts 13 on the threaded ends of the bracket 12 may be screwed which will pull the whole frame 1 back.

What I claim as my invention is:

1. A pulley support, comprising a frame; a pair of guides disposed at opposite sides of the frame and provided with perforated rear ends; a pair of slides mounted on said guides; a shaft journaled in said slides and extending transversely through said guides and frame; a pulley carried by said shaft and disposed within the frame; a threaded rod fixed to each slide and extending rearwardly through the perforated end of the corresponding guide; and a nut threaded on the projecting rear end of each rod and adapted to contact with the adjacent guide end, whereby the rotation of said nuts in one direction serves to retract the rods, and with them the slides and pulley.

2. A pulley support, comprising a main frame; a rectangular, skeleton guide frame connected to the main frame at each side thereof, said guide frames extending longitudinally of said frame and having their rear end members perforated; a pair of bearing blocks slidable in said guide frames; a shaft journaled in said blocks and extending transversely through the main and guide frames; a pulley carried by said shaft and disposed within the main frame; a threaded rod fixed to each block and projecting through the perforations in the rear end members of the guide frames; and a nut threaded on the projecting rear end of each rod and adapted to contact with the adjacent perforated frame member, whereby the rotation of said nuts in one direction serves to retract the rods, and with them the slides and pulley.

3. A pulley support comprising a frame provided at opposite sides with pairs of outwardly-extending perforated lugs having perforations formed horizontally therethrough; a horizontally-disposed U-shaped bracket for supporting said frame having threaded legs arranged on opposite sides of the frame and projecting forwardly through the perforations in said lugs; a pair of nuts threaded on the bracket legs and adapted to contact with the adjacent lugs, whereby the rotation of said nuts in one direction serves to retract said frame bodily; and a pulley mounted in said frame to move therewith.

4. A pulley support, comprising a frame provided at opposite sides with a pair of longitudinal guides; a pulley mounted in said frame and having means associated with it for effecting its bodily adjustment longitudinally of said guides; a bracket for supporting said frame with which the frame is connected; and means whereby said frame may be adjusted longitudinally of said bracket independently of the adjustment of said pulley.

5. A pulley support, comprising an elongated frame; a pulley mounted in said frame and adjustable longitudinally thereof; an elongated horizontal supporting bracket with which said frame is connected; and means whereby said frame may be adjusted longitudinally of said bracket independently of the adjustment of said pulley.

6. A pulley support, comprising an elongated frame provided at opposite sides with outwardly extending perforated lugs; a pulley mounted in said frame and adjustable longitudinally thereof; a U-shaped bracket for supporting said frame having its legs arranged on opposite sides of the frame and extending through the perforations in said lugs; and means coöperative with said legs for causing them to move through said perforations so as to effect an adjustment of said frame independently of the adjustment of the pulley.

Signed at Montreal, Canada, this 27th day of April, 1919.

ALEXANDRE CYR.

Witnesses:
C. PATENAUDE,
A. P. DEAL.